(12) United States Patent
Almoumen

(10) Patent No.: US 7,880,625 B2
(45) Date of Patent: Feb. 1, 2011

(54) LIQUID LEVEL WARNING DEVICE

(76) Inventor: Abdulmohsen Ahmed Almoumen, Block 13, Street 12, House 94, Alandalus (KW)

( * ) Notice: Subject to any disclaimer, the term of this patent is extended or adjusted under 35 U.S.C. 154(b) by 264 days.

(21) Appl. No.: 12/133,437

(22) Filed: Jun. 5, 2008

(65) Prior Publication Data
US 2009/0303060 A1 Dec. 10, 2009

(51) Int. Cl.
- G08B 21/00 (2006.01)
- G01F 23/30 (2006.01)
- G01F 23/56 (2006.01)

(52) U.S. Cl. .................. 340/623; 340/624; 73/307; 73/309; 73/319; 73/322

(58) Field of Classification Search .............. 340/618, 340/619, 623, 624; 307/113, 116, 118; 73/305–309, 73/311, 313, 314, 319–322, 322.5, 290 R, 73/293; 200/61.04, 190
See application file for complete search history.

(56) References Cited

U.S. PATENT DOCUMENTS

| | | | | |
|---|---|---|---|---|
| 3,545,272 A * | 12/1970 | McGill | ..................... | 73/311 |
| 3,746,035 A * | 7/1973 | Singer | ..................... | 137/416 |
| 3,872,429 A * | 3/1975 | Arney | ..................... | 340/450.3 |
| 5,065,139 A * | 11/1991 | Shefsky | ..................... | 340/620 |
| 5,283,569 A * | 2/1994 | Nelson | ..................... | 340/623 |
| 5,349,327 A * | 9/1994 | Waters | ..................... | 340/540 |
| 5,411,429 A * | 5/1995 | Klawiter | ..................... | 446/242 |
| 5,708,424 A * | 1/1998 | Orlando et al. | ........ | 340/870.08 |
| 5,743,135 A * | 4/1998 | Sayka et al. | ................... | 73/293 |
| 5,824,980 A * | 10/1998 | Sodergard | ................. | 200/84 R |
| 6,748,805 B2 * | 6/2004 | Lease | ..................... | 73/313 |
| 6,998,552 B1 * | 2/2006 | Li | ..................... | 200/84 C |
| 2007/0205907 A1 * | 9/2007 | Schenk, Jr. | ................. | 340/623 |

\* cited by examiner

*Primary Examiner*—Jennifer Mehmood
(74) *Attorney, Agent, or Firm*—Lowe Hauptman Ham & Berner, LLP

(57) ABSTRACT

A liquid level warning device with a separate audible alarm is disposed in a liquid tank for indicating the amount of liquid in the tank. The device also includes a plurality of float switches disposed at pre-selected levels within the tank and a plurality of LED's for indicating the level of liquid in the tank. A separate audible alarm independent of the visual indicators sounds an alarm when the tank is at a pre-selected level. A float switch is also disclosed.

5 Claims, 4 Drawing Sheets

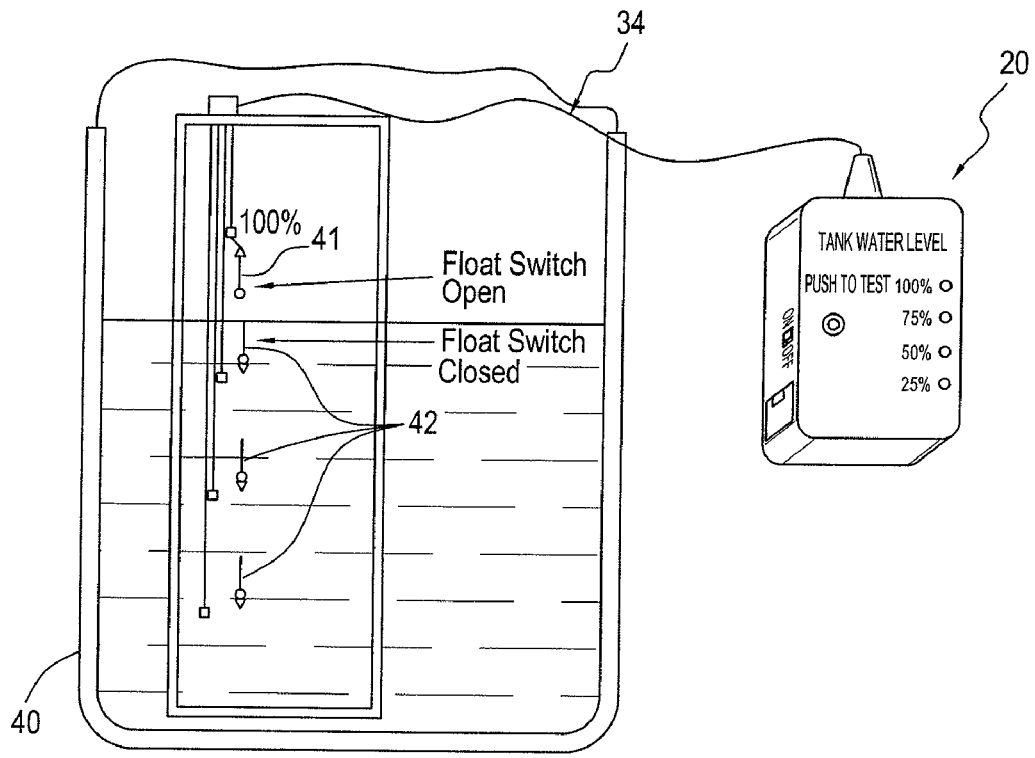
FIG. 3
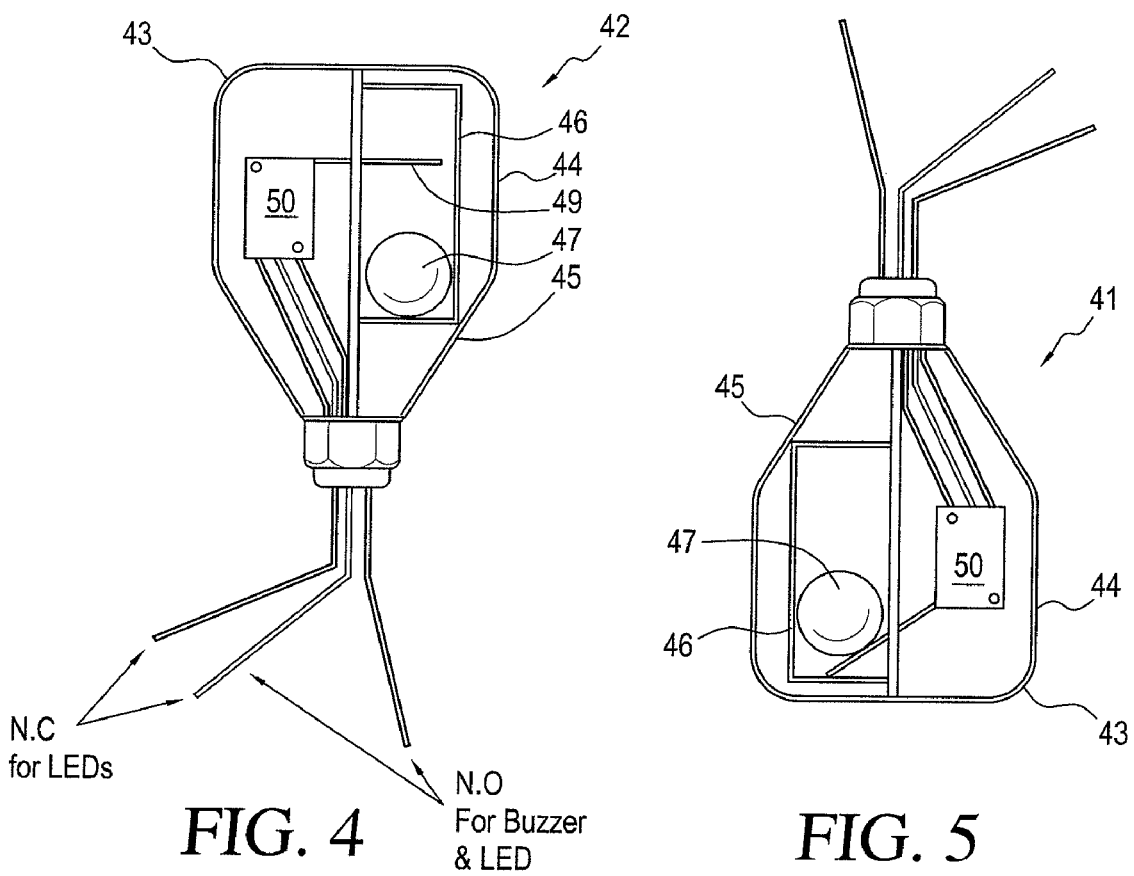
FIG. 4
FIG. 5

LIQUID LEVEL WARNING DEVICE

FIELD OF THE INVENTION

This invention relates to a liquid level indicating a warning device and more particularly to an indicating and warning device that provides a visual indication of the amount of liquid in the tank plus an audible warning when the liquid level reaches a pre-selected level. The invention also relates to a float switch for use in a device in accordance with the present invention.

BACKGROUND FOR THE INVENTION

Liquid level indicating and warning devices are well known and have been in use for many years to indicate the levels of oil, water and the like in storage tanks. For example, a U.S. patent of McGill (U.S. Pat. No. 3,545,272) discloses a liquid level warning device including a hollow buoyant member having a pair of electrical contacts at one end thereof and a ball of mercury or other moveable current carrying material mounted therein. The buoyant member is connected to a flexible carrier line which extends downwardly to a weight and then upwardly through an opening within the tank. The electrical contacts are connected to a source of electricity. Then, the distance between a buoyant member and the weight is adjustable so that normally when the tank is substantially filled the buoyant member will be disposed along a vertical axis and when the liquid falls to a pre-determined level the buoyant member will be disposed at a slight downward angle relatively to the horizontal plane so that the ball will roll by gravity into engagement with the electrical contacts to complete a circuit to an alarm or other indicator.

A more recent patent of Nelson (U.S. Pat. No. 5,283,569 discloses a float activated flood warning system with remote telephone reporting. The Nelson patent shows a flood warning system including a stilling well having three spaced apart switches therein for detecting the level of flood waters. Upon the water level reaching and closing a float switch a flood warning message is sent to a remote location.

Float switches for use in liquid level indicating and alarm systems are also well known. For example, a U.S. Pat. No. 5,824,980 discloses a float switch having a closed hollow body and a suspending and tethering electrical cable connected to the hollow body for conducing electrical power to and from a micro-switch confined within the body. A switch actuator is engaged and disengaged by a weight within the body. This weight actuator is pivotably supported within the hollow body and has a center of gravity which is offset from a central longitudinal axis of the sensor.

Notwithstanding the above, it is presently believed that there is a need and a potential commercial market for a liquid level indicator and alarm in accordance with the present invention. There should be a commercial market because such systems are compact, economical and work with a battery and more specifically a nine volt battery. Further, the use of the battery is minimized by the use of LEDs and by a push button switch so that the LEDs are only energized when the switch is held in an open position.

Further, a unique float switch in accordance with the present invention eliminates the need for mercury and at the same time provides a durable and reliable unit. A further advantage resides in an override for sounding an alarm even though the visual indicator is turned off as well as a master switch which turns off the alarm as well as the visual indicators. A system in accordance with the present invention provides a visual signal to show the status of the tank i.e. full, three-quarters full, half-full, one-quarter full etc. and provides that signal only upon pushing a push button switch. Further, the system includes an alarm that is independent of the visual signals but may be turned off by a master switch.

It is also believed that the liquid level indicator and alarm in accordance with the present invention can be manufactured at a relatively low cost and sold at a competitive price. In addition, such devices can be easily installed, easy to repair or replace, accurate and flexible in that adjustments can be made to sound an alarm at various levels. For example, the system could be readily modified to sound an alarm at a first selective level as for example when the tank reaches the one-quarter level and at a continuous and perhaps louder alarm when there is only one-tenth or less of the tank capacity remaining.

BRIEF SUMMARY OF THE INVENTION

In essence the present invention contemplates a liquid level indicating and warning device with an audible alarm. The device includes a tank for containing a supply of liquid such as water or heating oil and has a generally vertical component with a plurality of levels indicative of the amount of liquid remaining in the tank. The device also includes a plurality of float switches disposed at pre-selected levels within the tank. For example, in a preferred embodiment of the invention the device includes four float switches disposed at pre-selected levels to indicate full, three-quarter full, one-half full and one-quarter full. However, it should be recognized that other levels and more or less float switches can be used as for example a fifth float switch to indicate that the tank is approaching an empty condition.

Each of the float switches in accordance with the present invention includes a micro-switch and a captured ball disposed in a waterproof chamber. The captured ball is constructed and arranged to activate the micro-switch when the float switch is inverted. For example, when the float switch is immersed in liquid it will position itself into an upright position because of its buoyancy, but when the liquid level falls below the pre-selected level the float switch falls into an inverted position to indicate that the liquid has fallen below the selected level. A visual signal is indicative that the tank is filled to that level or that the tank has fallen below that level.

The indicating and warning device in accordance with the present invention also includes a plurality of light emitting diodes (LEDs) one of which is operatively connected to each of the float switches to indicate the status of liquid within the tank at a selected level. As contemplated by the invention each float switch has a corresponding LED. In a preferred embodiment of the invention, the LEDs are positioned in a remote location or on an exterior portion of the tank.

In addition to the above, the device in accordance with the present invention also includes an audible alarm for sounding a signal when the liquid level falls below a pre-selected level. The circuit includes a nine volt battery or the like that is provided for energizing the device and includes means for selecting a level at which to sound the audible alarm.

The invention will now be described in more detail in connection with the accompanying drawings wherein like reference numerals have been used to indicate like points.

DESCRIPTION OF THE DRAWINGS

FIG. 3 is a schematic illustration of an indicating and warning device in accordance with one embodiment of the invention;

FIG. 4 is a schematic illustration of a float switch according to the present invention with the float switch in a first position wherein the liquid level is supporting the float switch in an upright position;

FIG. 5 is a schematic illustration of a float switch shown in FIG. 4, but in an inverted position when the liquid level is below the level of the switch;

DESCRIPTION OF THE PREFERRED EMBODIMENTS OF THE INVENTION

A liquid level indicator and alarm system in accordance with the present invention provides a visual signal on demand to indicate the amount of liquid in a tank. For example, the amount of water or oil remaining in a storage tank can be checked by depressing a push button switch. The system also sounds an audible alarm when the liquid level reaches a pre-selected low level. While the visual signals are provided on demand, an audible signal is generated independently of the visual signal when a dangerously low level is reached.

Figure 1:
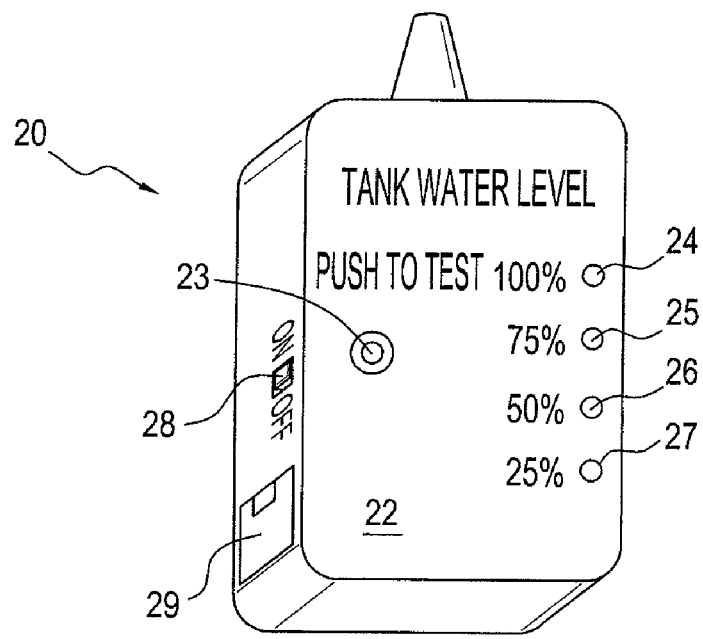
FIG. 1 is a perspective view illustrating a front portion of an indicator module that forms a part of a device in accordance with the present invention.
Figure 2:
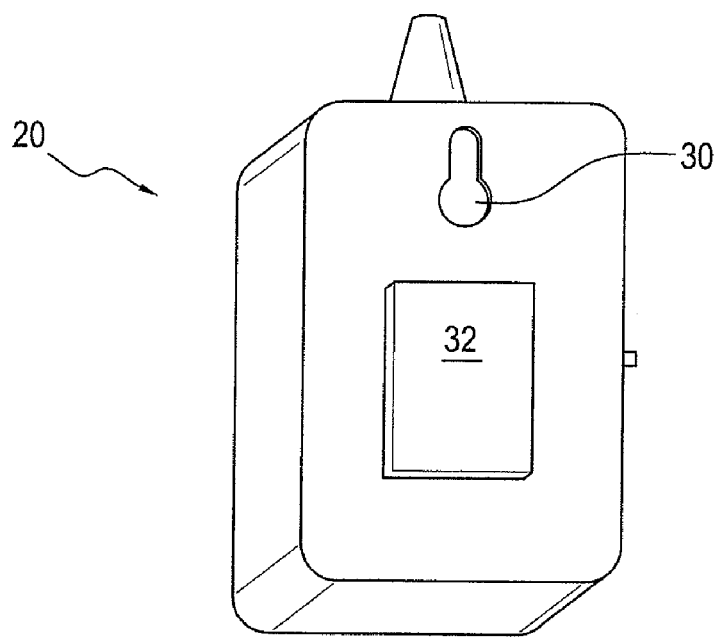
FIG. 2 is a perspective view illustrating a rear portion of the indicator module shown in FIG. 1.

The system will now be described in accordance with FIGS. 1-10. As shown in FIGS. 1 and 2, the system includes a module 20 which may have a generally cubic shape as shown or other shape as appropriate. As shown in FIG. 1, a face portion 22 of the module 20 includes a push button switch 23 and four indicator lights 24, 25, 26 and 27 that light up to indicate the level of liquid in a tank, as for example, full, three-quarter full, half full and one-quarter full. It should be recognized that the indicator lights can be used to indicate the filled portion or empty portions but will normally be used to indicate the amount of liquid in the tank. As indicated, a master switch 28 and battery door 29 are on one side of the module 20.

A reverse side of the module 20 (FIG. 2) includes means for mounting or positioning the module 20 in a remote location. For example, the module may be mounted on a wall next to the tank or on an outer surface of the tank. The module may include a conventional hanger 30 for mounting on a hook or the like or a magnetic plate 32 for mounting the module on the outer surface of a tank assuming that the tank is of iron or steel or other iron containing alloy.

A liquid level indicator and alarm system 34 as shown in FIG. 3 includes a tank 40 for containing liquids such as water, oil or the like. As illustrated the system also includes a vertical chamber 42 disposed within the tank 40 for positioning a plurality of vertically spaced float switches 41, 42, 43 and 44. The chamber 42 may or may not be needed but if used includes a number of openings so that the liquid level therein is the same as the liquid level in the main or outer tank 40. As shown, the float switch 41 is in an inverted position because the liquid level has dropped below the 100% level. By comparison, the float switches 42, 43 and 44 are in their upright position due to the buoyancy of the switches since they are under the surface of the liquid. Therefore, when the push button 23 is pressed three LEDs will illuminate the 25%, 50% and 75% indicators in the module 20 to indicate that the tank is 75% full or greater.

FIGS. 4 and 5 illustrate a float switch as used in a liquid level indicator and alarm in accordance with a preferred embodiment of the invention. As shown in FIG. 4, a float switch 42 is in an upright position which completes a circuit to illuminate a LED to indicate that the tank contains about three-quarter or more of its total volume of liquid.

Each of the switches 41 and 42 shown in FIGS. 4 and 5 include a waterproof hollow body 43 with a first portion 44 and second portion 45. For convenience the first portion 44 is referred to as a lower portion as shown when the float switch is in its inverted position while the second portion 45 is referred to as an upper portion. As shown, the first or lower portion 44 has the general shape of a right circular cylinder while the upper portion 45 is in the shape of a cone. A right circular cylindrical chamber or confining passageway 46 extends from the lower portion 42 near the bottom of the lower portion of the hollow body 43 into the upper portion 44. The confining passageway also contains a confined ball with a diameter that is slightly smaller than the diameter of the confining passageway 46. A micro-switch 50 is disposed in or fixed within the hollow body 43 adjacent the confining passageway 46. The micro-switch 50 also includes a spring bias arm or actuator 52 that extends through a slot (not shown) into the confining passageway 46 for actuating the micro-switch when it is pushed down by the ball 47 when the float switch 41 is inverted. As shown, the actuator 46 includes a weight 49 to return the actuator to its closed or open position when the float switch is returned to its upright position. The float switch 42 also includes a plurality of insulated electrical wires extending out of the top 48 of the hollow body 43.

The operation of the liquid level indicator and alarm will now be described in connection with FIGS. 6-10.

Figure 6:
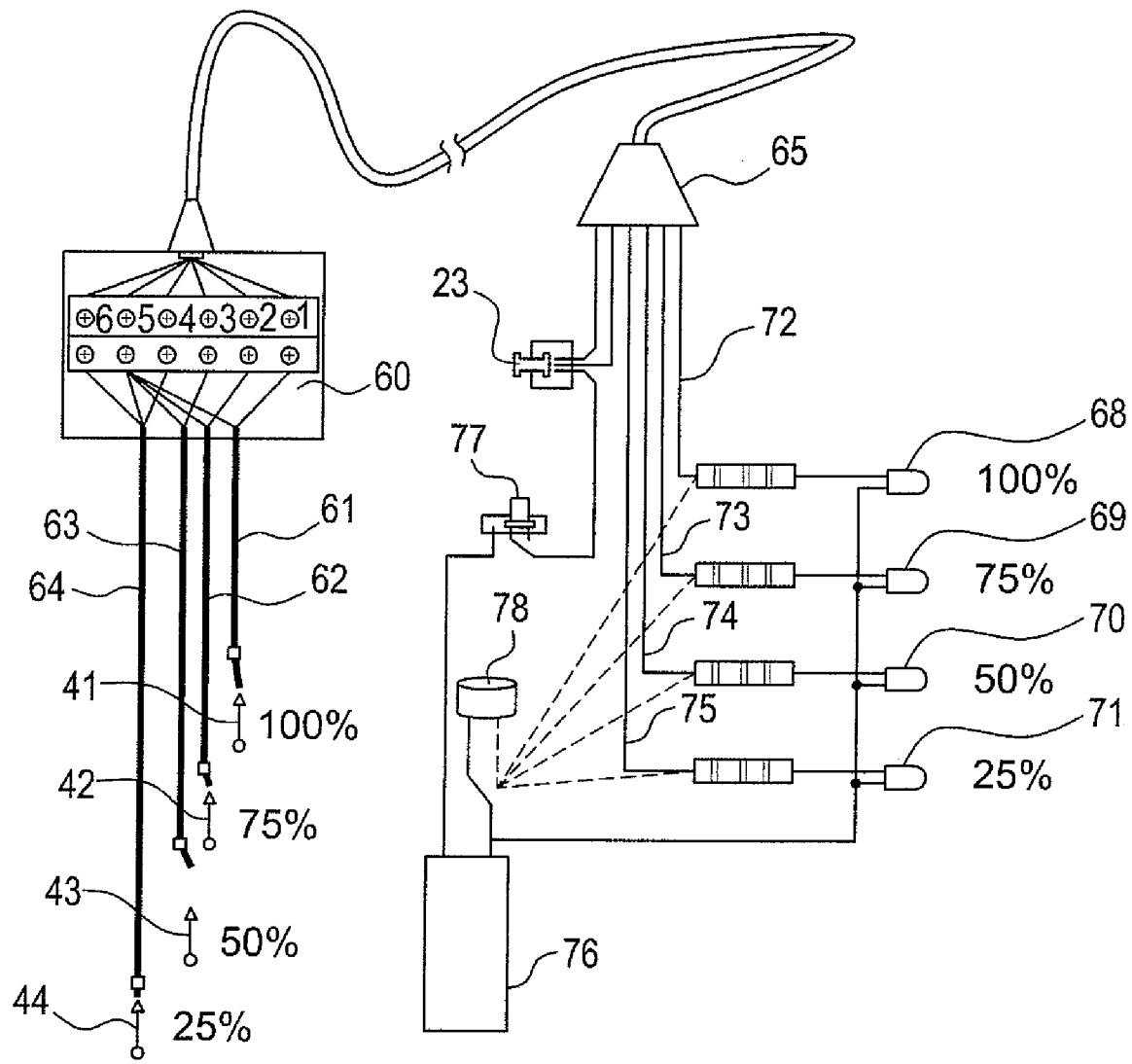
FIG. 6 is a schematic illustration of a liquid level indicator and alarm in accordance with the present invention.
Figure 7:
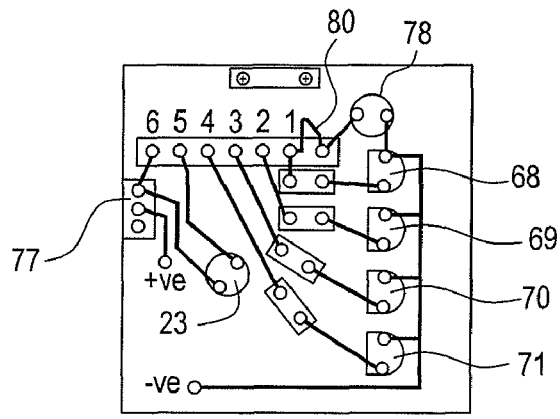
FIG. 7 is a schematic illustration showing the circuit connections with an audible alarm connected to a float switch disposed at a first pre-selected level in the tank.

As shown in FIG. 6 a plurality of four vertically spaced float switches 41, 42, 43 and 44 are connected to a connection box 60 by flexible wires or cables 61, 62, 63 and 64 respectively. A second connector box 65 is connected to the first connector box 60 by a plurality of wires or cables 67 that carries the signals from the float switches 41-44 to four LEDs 68, 69, 70 and 71 by means of wires 72, 73, 74 and 75. As shown the circuit also includes a battery 76 and buzzer 78.

Figure 8:
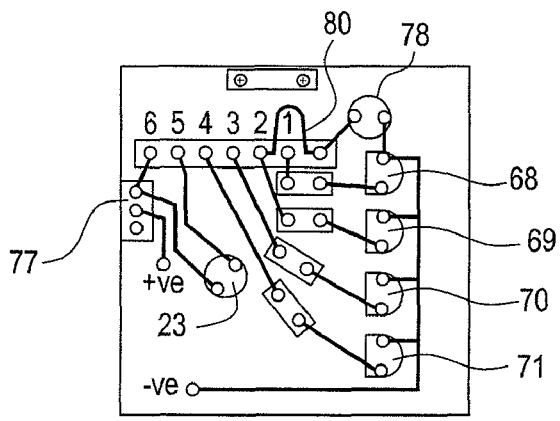
FIG. 8 is a schematic illustration showing the circuit connections with an audible alarm connected to a float switch disposed at a second pre-selected level in the tank.

The circuit also includes the push button switch 23 is normally in an open position until depressed to complete a circuit and a master switch 28 which is shown more clearly in FIGS. 7-10. For example in FIG. 7 the buzzer 78 and the first LED 68 are connected by a connector 80 so that the buzzer will sound when the tank is filled to 100% of its capacity. For comparison, FIG. 8 shows the connector 80 connected to the second LED 69 so that the buzzer sounds when the tank is filled to 75% of its capacity.

Figure 9:
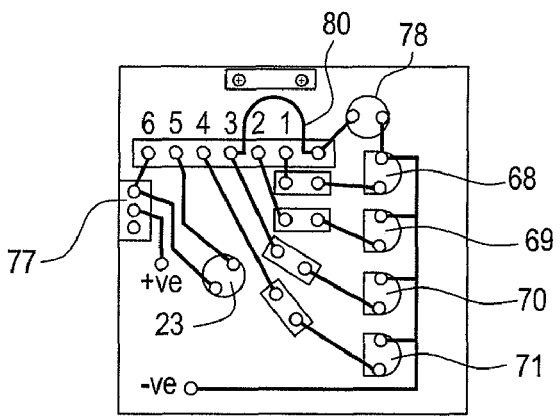
FIG. 9 is a schematic illustration showing the circuit connections with an audible alarm connected to a float switch disposed in a third pre-selected level in the tank.
Figure 10:
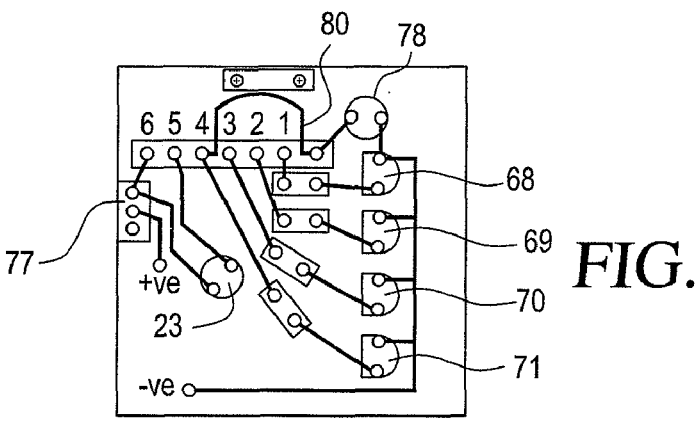
FIG. 10 is a schematic illustration showing the circuit connections with an audible alarm connected to a float switch disposed at a fourth pre-selected level in the tank.

As shown in FIG. 9 the connector 80 connects the buzzer to the third LED 70 to sound the buzzer when the tank reaches half full. Finally, FIG. 10 shows the buzzer 78 connected to the fourth LED 71 to sound the buzzer when the level of liquid drops to the 25% full mark. It is also contemplated that a fifth level where the tank is only 10 to 15 percent full could be connected to the buzzer instead of using the other levels.

While the invention has been described in connection with its preferred embodiments, it should be recognized that changes and modifications may be made therein without departing from the scope of appended claims.

What is claimed is:

1. A liquid level warning device and alarm comprising:
   a tank for containing a supply of liquid, said tank having a generally vertical component with a plurality of levels indicative of the amount of liquid in said tank,
   four float switches disposed within said tank with a first of said float switches disposed at a first pre-selected level to indicate 100% of the liquid capacity in the tank remaining and the other of said switches disposed at other pre-selected levels to indicate 75%, 50% and 25% of the liquid capacity in the tank remaining;
   each of said float switches including a micro-switch and a captured ball for activating said micro-switch when said float switch is inverted due to a change in liquid level;
   a plurality of light emitting diodes (LEDs) that are remote from said float switches with one LED operatively connected to one of said float switches to indicate the status of liquid within the tank at a selected level and the other of said LEDs operatively connected to the other of said float switches within said tank to indicate the status of liquid within the tank at other selected levels;
   an acoustical alarm for sounding a signal at one of the pre-selected levels;
   circuit means for selecting a level at which to sound an alarm;
   in which said micro-switch includes an activation paddle and in which said activation paddle is moved by said captured ball to change the status of said switches when the liquid level falls below the level of said switches;
   circuit means for selecting a level at which to sound an alarm; and
   which includes a nine volt battery and in which said LEDs and said acoustical alarm are energized by said nine volt battery;
   in which each of said float switches include a water tight body having a first lower portion in the general shape of a right circular cylinder and a second upper portion in the general shape of a frustum of a cone and wherein each of said float switches includes a confining chamber and a confined ball within said confining chamber, and a second chamber with said micro-switch contained therein, and a paddle activator extending from said micro-switch to a lower portion of said confined chamber whereby the inversion of said float switch activates said micro-switch.

2. A liquid level warning device and alarm according to claim 1 in which said circuit means includes a master switch and a second switch or push button switch wherein said master switch turns off said LEDs and said acoustical alarm and said second switch turns off said LEDs without turning off said alarm.

3. A liquid level warning device and alarm according to claim 1 in which said confining chamber is a right circular cylinder with a first diameter and said confined ball has a diameter slightly smaller than said first diameter so as to move freely within said confining chamber.

4. A liquid level warning device and alarm according to claim 3 which includes means for adjusting the position that will activate the acoustical alarm.

5. A float switch for use in a liquid level indicator and alarm, said float switch comprising:
   a hollow waterproof body having a first portion with the shape of a right circular cylinder and a continuous second portion in the shape of a frustum of a cone;
   a confining chamber having the shape of a right circular cylinder disposed within said hollow waterproof body and a confined ball within said confining chamber;
   an adjacent chamber within said hollow waterproof body next to said confining chamber and a micro-switch disposed in said adjacent chamber; and
   a paddle actuator operatively connecting said micro-switch and extending into said confined chamber for actuating said micro-switch when said confined ball comes into contact with said paddle actuator in response to a change in orientation of said float switch.

* * * * *